United States Patent [19]
Carmona

[11] Patent Number: 5,673,440
[45] Date of Patent: Oct. 7, 1997

[54] ADD-ON DUAL FLUSH TOILET WATER SAVER

[76] Inventor: Angel Garcia Carmona, C/Sn. Vicente 37, 3°, 03004 Alicante, Spain

[21] Appl. No.: 538,013

[22] Filed: Oct. 2, 1995

[51] Int. Cl.$^6$ ............................................. E03D 1/14
[52] U.S. Cl. .................................................. 4/325
[58] Field of Search .............................. 4/324; 325/415

[56] References Cited

U.S. PATENT DOCUMENTS

| | | | |
|---|---|---|---|
| 4,032,997 | 7/1977 | Phripp et al. | 4/324 X |
| 4,120,056 | 10/1978 | Phripp et al. | 4/324 |
| 5,073,995 | 12/1991 | Jennison et al. | 4/415 |
| 5,103,507 | 4/1992 | Sprajc et al. | 4/415 X |
| 5,511,253 | 4/1996 | Zamudio-Castillo et al. | 4/325 |

*Primary Examiner*—Charles E. Phillips

[57] ABSTRACT

A unit for conserving water when flushing the toilet bowl, the unit comprising a vertical back strip from each end of which extends a collar adapted to be clamped about corresponding ends of the overflow pipe of toilet bowl flushing mechanism. To each collar is pivoted a forked end of a dual-forked hinge, and an opposite forked end of each hinge is pivoted to corresponding ends of a vertical bar overhanging the outlet valve of the tank. The bar is adapted to be carried up or down relative to the valve, accordingly as a connected weight floats with the level of water in the tank. In the use of the assembled unit, actuation of the flush handle raises the valve into abutment with the bar, and momentary release of the handle after actuation causes the weighted bar to float down with the level of escaping water to reseat the valve. A small amount of water empties from the tank with this action for a flush of liquid waste. The handle is held actuated to allow emptying of the tank for a flush of solid waste. Means is provided for automatically restraining the bar from reseating the valve until the tank is emptied for a flush of solid waste.

4 Claims, 2 Drawing Sheets

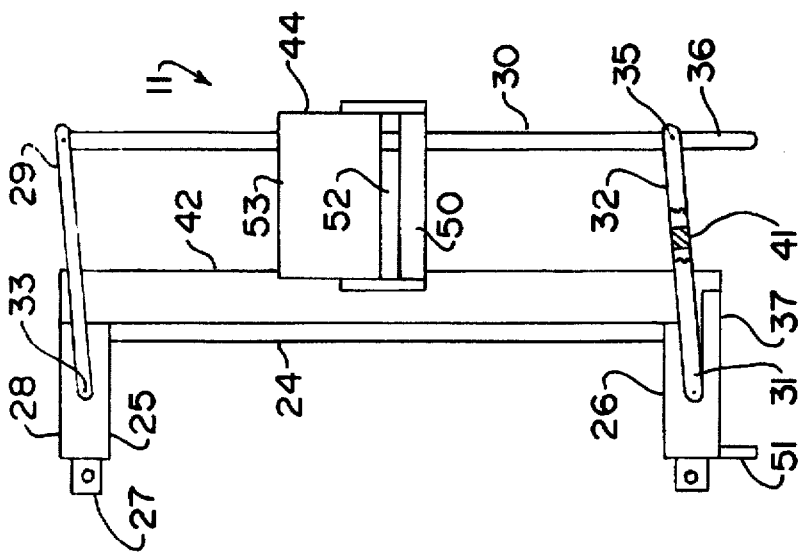
FIG. 1
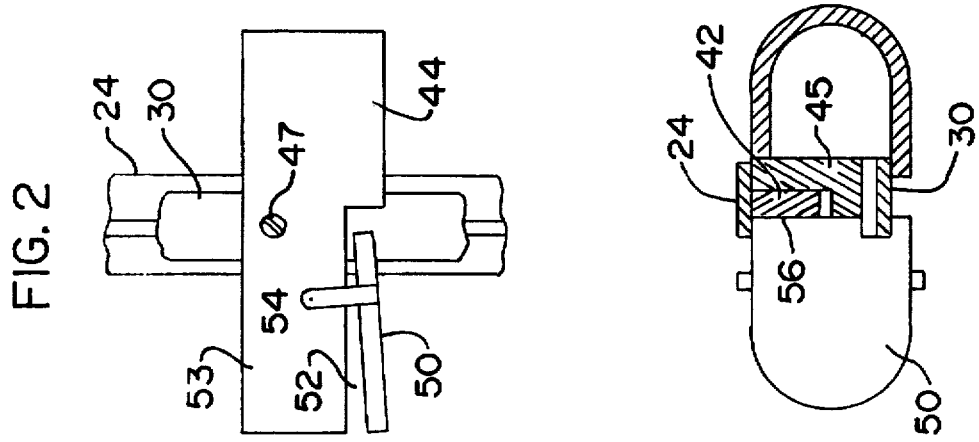
FIG. 2
FIG. 9
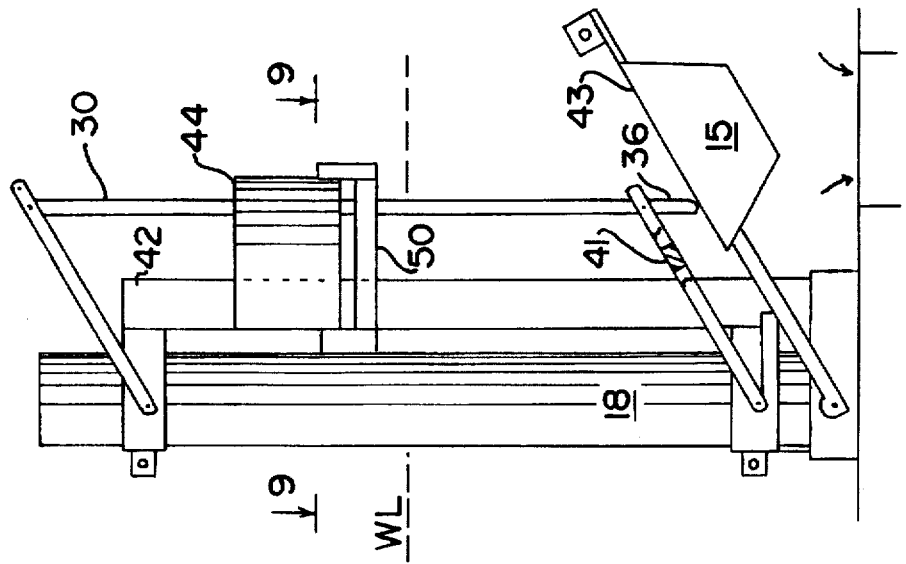
FIG. 8

ADD-ON DUAL FLUSH TOILET WATER SAVER

This invention is concerned with means for materially reducing the amount of water consumed in flushing the conventional toilet bowl. More particularly, it is directed to the provision of new and useful improvements in toilet bowl flushing apparatus, whereby at the election of the user flushing may be effected by a discharge of a small amount of water for liquid waste or by a larger amount for solid waste.

The numerous uses of water are rapidly depleting its supply. Accordingly, there is a pressing need for conservation. Toilet flushing is a particular area in which a considerable amount of water is consumed. Some reports are that it represents about of total indoor water consumption. The average household flushes its toilet some twenty times per day; and a considerable amount of water is discharged with each flush. Further, approximately 85% of the flushes are for liquid waste.

It has been found that a partial emptying of the tank's water content is all that is needed for flushing liquid waste, while a full emptying of the tank serves to flush solid waste. Unfortunately however, the present nature of conventional toilet flushing apparatus is such that, when it is operated, the full contents of the tank empties whether liquid or solid waste is being flushed. The user has no practical control over its mode of operation.

Accordingly, a general object of this invention is to provide a unit that may be added on to the overflow pipe of conventional toilet bowl flushing apparatus and which, when added, enables operation of the flushing apparatus to obtain at the election of the user a partial emptying of the tank's water to flush liquid waste from the bowl, or a full emptying of the contents of the tank to flush solid waste.

A further object of the invention is to provide such a unit which is simple in structure, capable of being easily applied to conventional toilet bowl flushing apparatus, inexpensive to manufacture, and practical for the purposes intended.

BRIEF SUMMARY OF THE INVENTION

This invention provides a unit made of lightweight material, such as plastic. It is adapted to be added onto the overflow pipe of conventional toilet bowl flushing apparatus. The unit includes a vertical supporting strip provided at its ends with collars adapted to be clamped about the overflow pipe. Hinged to the collars in spaced parallel relation to the strip so as to overhang the outlet valve of the flushing apparatus is a vertical bar weighted with a floatable container of water. The bar is adapted to be carried up or down relative to the valve accordingly as the container floats up or down with the level of water entering or leaving the tank of the apparatus. While the valve is seated over the outlet, the container will be floating in the water of the tank and the bar will be elevated by the container above and clear of the valve. When a flush handle connected by lift elements to the valve is operated, it will raise the valve from its seat into abutment with the elevated bar; and, if the flush handle should be promptly released after it has been operated, the container and bar will float down with the water level as the water flows through the unseated valve to cause the bar to push the abutting valve to seated condition, before an appreciable amount of water can flow from the tank to the bowl. This small amount of water suffices to flush liquid wates from the bowl.

However, if the flush handle were not promptly released and were to be retained in its operated condition, the raised valve, being held in abutment with the bar, will restrain the container and the bar from moving down, sad a large amount of water will flow from the tank through the outlet to flush solid waste from the bowl.

The unit includes means that is automatically operable to latch the container to the supporting strip shortly after the valve has been unseated by the flush handle and the water level has dropped below the container. This avoids the need of holding the flush handle operated for a flush operation of solid waste. The valve will then float down with the water to reseat over the outlet as the tank empties. Refilling of the tank then functions to refloat the container and to release the latched condition.

The foregoing structure, its features and advantages will become increasingly apparent as this specification unfolds in greater detail, and as it is read in conjunction with the accompanying drawing. However, it is to he expressly understood that the drawing is for purposes of illustration sad description, and it is not to be construed as limiting the scope of the invention.

BRIEF DESCRIPTION OF THE DRAWING

In the accompanying drawing:

FIG. 1 is a side elevation of a unit embodying the invention, and shown apart from the toilet bowl flushing apparatus to which it is adapted to be added;

FIG. 2 is a rear elevation of the container element of the unit shown in FIG. 1, together with fragmentary portions of a vertical bar and strip element of the unit;

FIG. 3;

FIG. 8 is a side elevation of the apparatus and the unit showing their relative positions obtained during a solid flush operation; and FIG. 9 is a section on line 9 of FIG. 8 of the container element in which it is above water level and in unlatched condition.

DETAILED DESCRIPTION OF THE INVENTION

Figure 3:
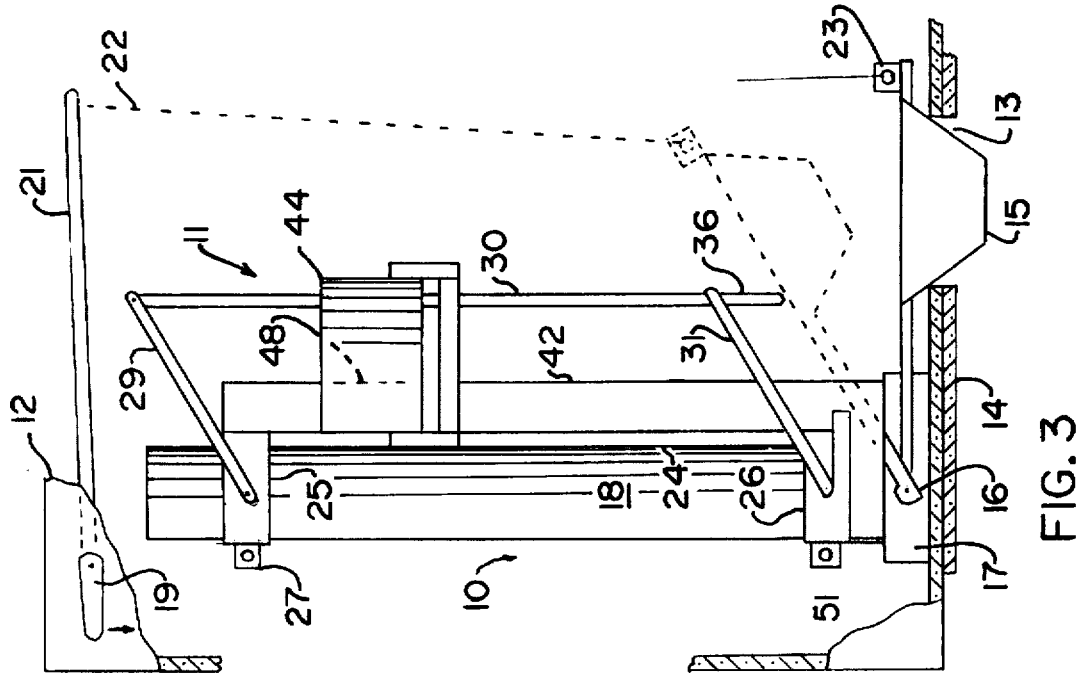
FIG. 3 is a side elevation of the unit embodying the invention added onto the toilet bowl flushing apparatus, and showing in solid line the condition of the unit and the flushing apparatus prior to a flush operation being made, and showing the flapper valve of the apparatus in broken line following operation of the flushing apparatus; the letters WL indicate the water level prior to a flush operation.

In the accompanying drawing there, is shown in FIG. 3 a conventional toilet bowl flushing apparatus 10 to which a unit 11, shown in FIG. 1, embodying the invention has been added. Only enough of the flushing apparatus is shown as will suffice to understand the association of the unit 11 with it.

The flushing apparatus 10 is of a conventional type and mode of operation. It includes (FIG. 3) a tank 12 connected at its bottom by an outlet 13 with a toilet bowl 14. A flapper valve 15 seated over the outlet is hinged at its rear 16 to opposite sides of an overflow pipe 18. A flush handle 19 is connected by a valve lift lever 21 and chain 22 to a free end 23 of the valve 15. Manually turning the flush handle counterclockwise (in the direction of the arrow) acts in conventional manner through the lift, lever 21 and the chain 22 to swing or unseat the valve 15 angularly upward (broken line in FIG. 3) from the outlet 13. Water then rushes from the tank through the outlet to flush waste from the bowl. The valve floats down to seated condition over the outlet as the water beneath it flows from the tank. A conventional refill valve and associated ball-cock float, (both not shown) of the flushing apparatus 10 automatically function to refill the tank with water following reseating of the flapper valve 15 over the outlet 13.

Figure 4:
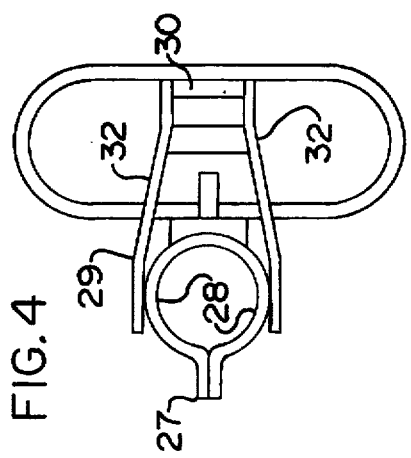
FIG. 4 is a top plan of the unit as shown in FIG. 3.

The unit 11 (FIG. 1) embodying the invention includes a vertical supporting element or strip 24. A collar 25 extends at right, angles rearwardly from an upper end of the strip. The collar is integral with the strip 24. A second collar 26 similarly extends from the lower end of the strip. Each collar is split at its free or rear end to provide a pair of opposed arms 28 which terminate in opposed ears 27 (FIGS. 1, 4). The arms 28 of the collars are flexible so as to enable the collars to be flexed for secure engagement about the overflow pipe 18, and to be fastened to it by tightening the opposed ears 27 together in suitable manner, as by a screw 20.

A pair of dual-forked hinges 29, 31 pivotally connect a vertical bar 30 to the collars and to the overflow pipe to which the collars may be mounted. She upper hinge 29 has a pair of opposed arms 32 (FIG. 4) which are pivoted at their rear ends in suitable manner, as by pins 33, to opposite sides of the upper collar, end are similarly pivoted at their opposite ends to opposite sides of the bar 30. She lower hinge 31 is similarly pivoted to opposite sides of the lower collar 26 and to opposite sides of a lower end 35 of the bar 30. The hinges 29, 31 are supported by the collars and the bar in parallel relation to each other; and the bar is supported by the hinges in parallel vertical spaced relation to the strip 24 at all times. A short portion 36 of the bar 30 depends below the related hinge connection 35 for a purpose as will later be described.

The hinges 29, 31 extend away from the related collars and from the overflow pipe 18, to which the unit may be mounted, a distance in which the depending end 36 of the bar overhangs the seated valve 15 in a raised condition of the hinges and the bar, as appears in FIG. 3.

Figure 7:
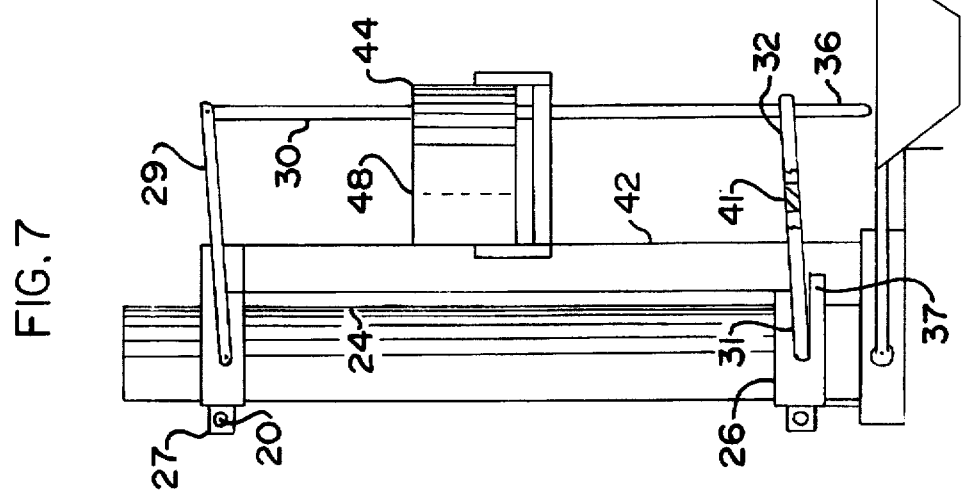
FIG. 7 is a side elevation of the flushing apparatus and the unit in a condition obtained following reseating of the outlet valve in a partial flush operation.

The hinges are limited to the extent to which they may be angularly pivoted to vertically raise or lower the bar relative to the seated valve. In this respect, the lower collar 26 has a shoulder 37 upon which the arms 32 of the lower hinge 31 will abut to limit downward movement of the hinges to a substantially horizontal position, as appears in FIG. 1. In this position the bottom end 36 of the bar 30 will rest upon the seated valve, as appears in FIG. 7. Further, the lower hinge 31 functions on upward angular movement of the hinges to limit the extent to which the hinges and the bar may be raised. In this respect, a rib 41 (FIG. 1) extending between the opposed arms 32 of the lower hinge is adapted on upward movement of the hinges to abut a vertical rail 42 projecting from and extending along a mid-area of the strip 24, as appears in FIG. 8. The limited upward movement of the hinges carries the bottom end 36 of the bar 30 to a level at which it will be in abutment with the back 43 of valve 15, when the valve is unseated in a flush operation, as appears in FIG. 8.

Mounted to the bar 30 is a weight in the form of a container 44. The container is filled with water, and it is floatable in the water of the tank 12. It serves to raise the bar 30 to its upper limited height (FIG. 3) as the container floats upward with the rising level of water filling the tank; and it serves to lower the bar as the container floats down with the lowering of the level of water emptying from the tank.

Figure 5:
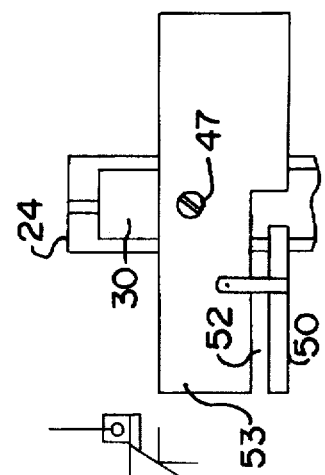
FIG. 5 is a rear elevation of the container element of the unit, as shown in FIG. 3 floating in an unlatched conditioner.

The bar 30 extends with a slide fit through an inner wall 45 (FIG. 6) located in the mid area of the container. The container may, accordingly, be slidably adjusted to a position along the bar 30 so as to maintain a floating condition in accordance with the level of water in which it will float. The adjusted position of the container is adapted to be fixed by suitable means, such as a screw 47 (FIGS. 2, 5) threaded through a rear wall of the container into abutment with the bar 30.

Figure 6:
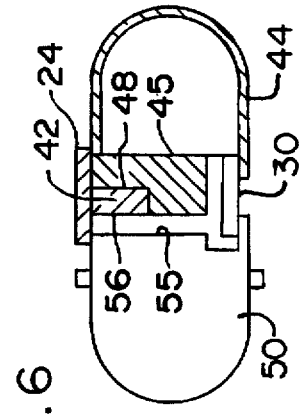
FIG. 6 is a section on line 6 of FIG. 5.

The container has a recess 48 (FIGS. 3, 6) extending vertically of its inner wall 45. As the container is floated upward, as it will with a rising level of water entering the tank, it carries the bar 30 with it. The upward movement of the Bar pivots the hinges 29, 31 angularly counterclockwise (FIG. 3) and draws the container inwardly toward the rail 42. When the hinges have reached their upper limit, the recess 48 in the container will have moved over and fully received the projecting rail into it (FIGS. 6, 3). And as the container floats downward, as it will with the lowering level of water emptying from the tank, it carries the bar 30 down with it, and the hinges will pivot angularly clockwise to draw the container away from the rail, as appears in FIG. 7.

In making use of the unit 11, it will he applied to the overflow pipe 18 to a position in which the depending leg 51 (FIG. 3) at the lower end of the collar 26 rests upon the shoulder 17 located at the bottom end of the overflow pipe 18. The collars 25, 26 are to then be clamped about the overflow pipe. As earlier described, the container 44 will float, as in FIG. 3, up with the water entering the tank to raise the hinges 29, 31 together with the bar 30 to the extent limited by the lower hinge 31.

Now, on manually turning the flush handle 19 counterclockwise in the direction of the arrow for a flush operation, the valve 15 will be angularly lifted by the lever 21 and the chain 22 from the outlet 13 into abutment, (broken line FIG. 3) with the bottom portion 36 of the bar 30, and water will rush from the tank through the outlet 13 to flush the bowl 14. If at the time of turning the flush handle 19 a liquid flush is intended, the operator will promptly release the handle. The container 44 unrestrained by the release of the handle and being weighted with water will, together with the bar, move down with the water level and push the valve 15 down to close the outlet 13, as appears in FIG. 7, before an appreciable amount of water will have emptied from the tank into the bowl. The small amount of water discharged will suffice for a flush of liquid waste.

Now, if a solid flush of waste from the bowl is intended, the operator will manually turn the flush handle 19 counterclockwise in the direction of the arrow. This action will raise the valve 15 angularly from the outlet 13 into abutment with the bottom end 36 of the bar 30 (FIG. 8). While the operator manually holds the flush handle turned, the abutment of the raised valve with the bar will restrain the water weighted container 44 and the bar 30 from moving down and pushing the valve back over the outlet. She water in the tank will then empty to flush solid waste from the bowl. Upon emptying of water from the tank, the operator may then release the handle to allow the valve to reseat to closed position over the outlet. The tank will then refill in conventional manner upon automatic operation of the inlet valve and ball-cock float, both not shown.

To avoid the need of the operator to manually hold the flush handle 19 turned to obtain a solid flush operation, the container is provided with means 50 for automatically latching the container against downward movement from a raised condition. To obtain this automatic latching condition of the container, the operator will hold the flush handle turned for a brief time, such as for a count of 1-2-3, and then release the flush handle. The latching means will then function to restrain the bar 30 end the container 44 from moving down and reseating over the outlet 13.

The latching means is in the form of a latch element 50, which is floatable in the water of the tank with the container. It is located in a space 52 below a portion 53 of the container that is located the one side of the bar 30 and the rail 42, as appears in FIGS. 1, 2. The latch element is hinged, as at 54, to opposite sides of the container portion 53. When the latch element is floating, as in FIG. 3, in the water of the tank, and as appears in FIG. 5, it will obtain a level or horizontal condition in which an inner wall 55 of the latch element will be away from and clear of an opposing side 56 of the rail 42, as appears in FIG. 6. But, when the latch element obtains a condition with the raised container above the level (WL) of water in the tank, as in FIG. 8, the weight of the latch element will cause it to pivot downward relative to the container portion 53 and press its inner wall 55 against the side 56 of rail 42, as appears in FIG. 9. While the latch element is abutting the rail, it will restrain the container 44 and the bar 30 from moving downward. Accordingly, when a solid flush operation is intended, during the brief time count of 1-2-3 that the operator holds the flush handle turned and the valve 15 raised from the outlet 13, the water level (WL) in the tank will have dropped to a level below the latch element, as appears in FIG. 8. As the latch element then pivots angularly downward into abutment with the rail 42, the container and the bar 30 will be restrained from moving downward to reseat the valve 15. The operator may then release his hold on the flush handle, and the tank will in conventional manner empty as the valve 15 remains raised and unseated and as it floats down the water emptying beneath it from the outlet and reseats. The tank then refills with water in conventional manner, and the unit 11 refloats to the FIG. 3 condition.

While an embodiment of the invention has been illustrated and described in detail, it is to be expressly understood that the invention is not limited thereto. Various changes of form, design or arrangement may be made in its components without departing from the spirit of the invention. It is my intent, therefore, to claim the invention not only as shown and described but also in all such forms and modification or equivalents thereof as might be construed to be within the spirit of the invention when considered in the light of the specification, the drawing and the appended claims.

What is claimed is:

1. A unit adapted to be mounted to the vertically standing overflow pipe of a toilet bowl flushing means, the flushing means having an outlet valve, the unit comprising: an upper collar adapted to be mounted about an upper end of the pipe, a lower collar adapted to be mounted about a lower end of the pipe, a vertical strip mounted at an upper end thereof to the upper collar and mounted at a lower end to the lower collar, a vertical bar disposed in spaced relation to the strip, a hinge having a forked rear end pivoted to the upper collar and having an opposite forked end pivoted to an upper end of the bar, a second hinge having a forked rear end pivoted to the lower collar and having an opposite forked end pivoted to a lower end of the bar, and the bar having a bottom end portion thereof depending below the forked connection of the lower hinge with the bar adapted in a mounted condition of the unit to overhang the outlet valve of the flushing means.

2. In a flush water tank having a vertically standing overflow pipe and an outlet to a toilet bowl, a flapper valve pivotable from a normal condition seated over the outlet to a raised condition allowing an outflow of water from the tank to the bowl, and a lever supported by a wall of the tank having a chain connection with the valve, the lever being manually pivotable from a normal unactuated condition to raise the valve from its seat, and the lever together with the valve being gravitationally returnable to normal condition following manual release of the lever, the improvement comprising: a unit mounted to the overflow pipe, the unit comprising an upper collar mounted about an upper end of the pipe, a lower collar mounted about a lower end of the pipe, a vertical strip mounted at one end to the upper collar and at the other end to the lower collar, a vertical bar, a hinge having a forked rear end pivoted to the upper collar and having a forked opposite end pivoted to an upper end of the bar, a second hinge having a forked rear end pivoted to the lower collar and having a forked opposite end pivoted to a lower end of the bar, the bar being disposed in overhanging relation to the valve, a weight mounted intermediately of the ends of the bar and being floatable with the bar up or down with the level obtained by water entering or leaving the tank, and the valve being manually pivotable by the lever and chain to an unseated condition in which it abuts a bottom end of the bar, and the bar being floatable down with the weight against the valve to reseat the valve as water empties from the tank.

3. In a flush water tank as in claim 2, wherein the weight is a container filled with water.

4. In a flush water tank as in claim 2, wherein the collars are split and arms of the collars provided by the split are clamped about the overflow pipe.

\* \* \* \* \*